(12) United States Patent
Antinoro

(10) Patent No.: US 6,796,996 B2
(45) Date of Patent: Sep. 28, 2004

(54) SHAPE-RETAINING FILL CONTAINER

(76) Inventor: Barbara A. Antinoro, P.O. Box 3034, San Diego, CA (US) 92163

( * ) Notice: Subject to any disclaimer, the term of this patent is extended or adjusted under 35 U.S.C. 154(b) by 0 days.

(21) Appl. No.: 10/029,592

(22) Filed: Dec. 20, 2001

(65) Prior Publication Data

US 2003/0115670 A1 Jun. 26, 2003

(51) Int. Cl.⁷ .................................................. A61F 7/00
(52) U.S. Cl. .......................... 607/114; 607/96; 5/655.4; 5/655.5
(58) Field of Search ....................... 607/114, 96; 5/911, 5/655.4, 655.5, 421

(56) References Cited

U.S. PATENT DOCUMENTS

| | | | |
|---|---|---|---|
| 2,024,908 A | | 12/1935 | Blum .............................. 150/1 |
| 4,903,859 A | | 2/1990 | Derby et al. ................. 220/462 |
| 5,129,391 A | * | 7/1992 | Brodsky et al. ............ 607/110 |
| 5,184,613 A | * | 2/1993 | Mintz .......................... 607/104 |
| 5,190,033 A | * | 3/1993 | Johnson ....................... 607/108 |
| 5,352,043 A | | 10/1994 | Takagaki et al. ............ 383/104 |
| 5,476,492 A | * | 12/1995 | Unrug ........................ 607/114 |
| 5,603,727 A | * | 2/1997 | Clark et al. ................. 607/108 |
| 5,660,478 A | | 8/1997 | Alack et al. ................. 383/119 |
| 5,664,887 A | | 9/1997 | LaFleur ....................... 383/119 |
| 5,873,655 A | | 2/1999 | Echeverria .................. 383/119 |
| 5,948,010 A | | 9/1999 | Adamec ....................... 607/96 |
| 6,117,164 A | * | 9/2000 | Gildersleeve et al. ....... 607/108 |

OTHER PUBLICATIONS mainstreet–blueridge.com, Nature's Moist Heat, http://mainstreet–blueridge.com/Nature'sMoistHeat/ of Nov. 28, 2001, 3 pages, Internet publication.

shop.store.yahoo.com, Yahoo Shopping, Basic Comfort Bags, http://shop.store.yahoo.com/comfortbags/longbags.html of Nov. 28, 2001, 2 pages, Internet publication.

* cited by examiner

Primary Examiner—Linda C. M. Dvorak
Assistant Examiner—Jocelyn Ram
(74) Attorney, Agent, or Firm—Frank G. Morkunas

(57) ABSTRACT

A shape-retaining bag having a front and a back connected to each other to define a chamber between for housing and retaining a fill material within a plurality of cells within the chamber which are made of a plurality of walls and one or more flow diverters adjacent to the cells and on the ends of the walls. A passageway is on a fill-side with a second passageway on an opposing side, each passageway extending approximately from one end side to another end side of the bag. As fill material is introduced into the chamber, it passes through the cells and the passageways in a fashion dictated by the cells and by the flow diverters until the bag is filled. The configuration of the various cells and flow diverters permit the bag to retain its shape notwithstanding the fill material within.

16 Claims, 3 Drawing Sheets

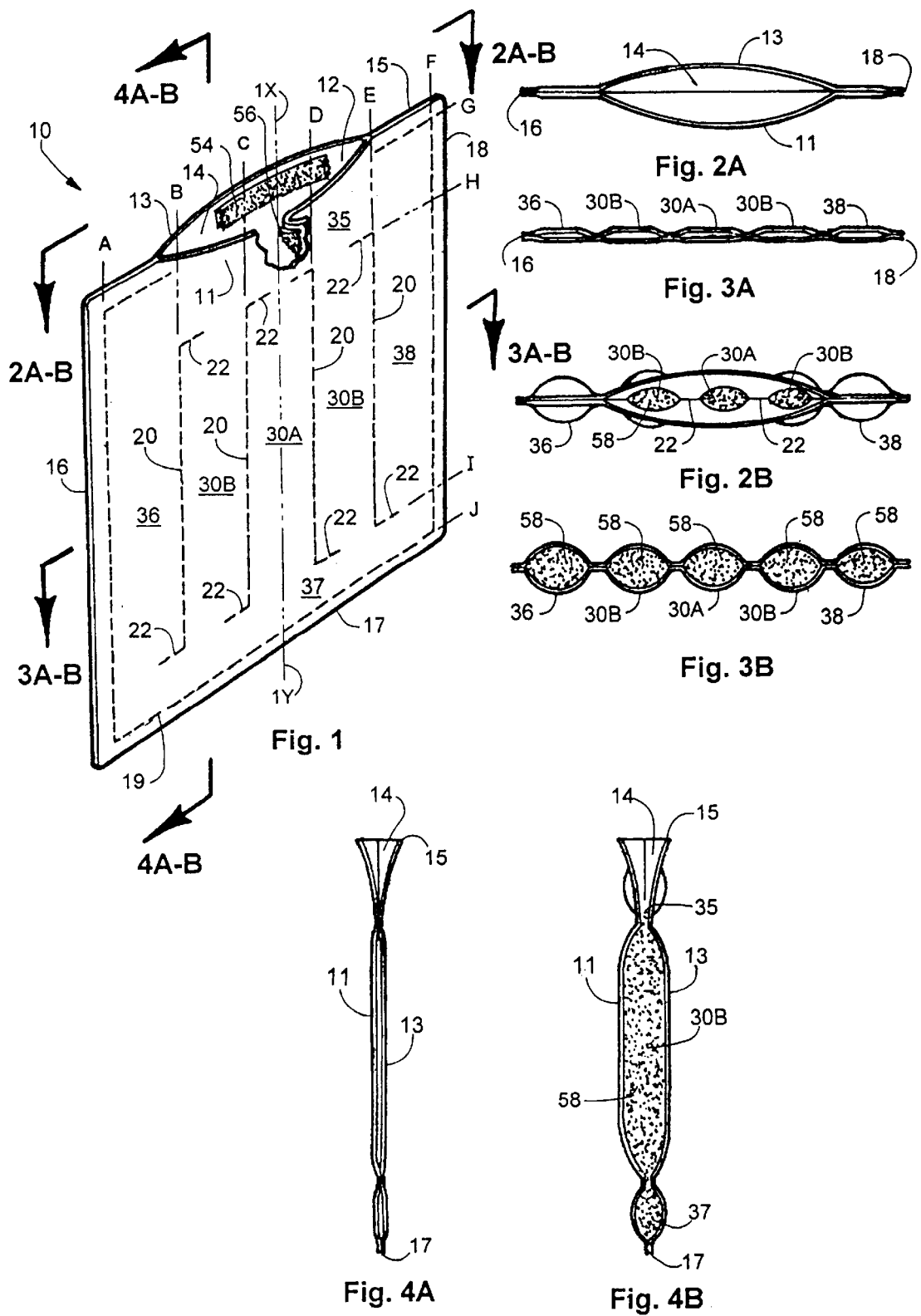

SHAPE-RETAINING FILL CONTAINER

CROSS REFERENCES TO RELATED APPLICATIONS

None.

STATEMENT REGARDING FEDERALLY-SPONSORED RESEARCH OR DEVELOPMENT

Not applicable.

BACKGROUND OF THE INVENTION

This present invention relates to an improvement in fill containers, and more particularly to containers used as comfort pads, heating pads, and cooling pads; and most particularly to such pads for use by and with pets.

It is estimated that there are approximately 73,000,000 cats and 68,000,000 dogs owned or treated as pets by the American people. Pets are cared and provided for by their owners. Their comfort needs generally are tended to by the caring owner. Such needs include proper nutrition, routine health care, veterinary needs, pre-operation and post-operation needs, sanitation needs, recreational needs, and resting needs. Large pet stores are common place. Pet beds of varying shapes and materials abound. Soft pads or mattress-like inserts line most such beds. Pets can suffer from discomfort, such as heat, cold, pain, sore muscles, and any myriad of other physical discomforts and ailments which may or may not require veterinary attention. Owners have provided their pets with jackets, mittens, and sweaters to alleviate their discomfort.

Heating and cooling pads do exist; some are electrical others house a fill-material which, when heated or cooled, retains such properties for a period of time. The problem with existing pads is that, in order to maintain their shape, they must be filled to capacity. Such shapes are not conducive to use in a pet bed or to be placed over a pet as are flatter pads. Flatter pads, however, when lifted by an end side, lose their shape as the fill-material within, by gravity, remains at or falls to the relative bottom. Such a pad may be re-shaped, of course, but that makes their use somewhat less convenient than had the pad not lost its shape. The present invention eliminates such problems while providing needed moist heat and cooling comfort, as the situation may warrant, to a pet. The pad of the present invention is not limited to dogs and cats, however, as any and all domestic animals may benefit from its unique and novel uses. Examples of such pets include, but are not limited to, rabbits, hamsters, mice, snakes, pigs, horses, and other pet-oriented animals.

The present invention provides for a new and useful reusable organically-filled chambered pad/bag for applying either moist heat or cooling to any desired surface. Heat application is preferably by microwaving the bag with its fill-material and cooling application is preferably by placing the bag with its fill-material in freezer. The inner filled chambered bag is of muslin material or any other material that serves the heating/cooling purpose. Its chambered compartments may be of varied designs and shapes as its structure is suited to facilitate a quick and even fill into the numerous cells and is suited for the various organic fill-materials usable therein to stay firmly and evenly therein and to thereby retain the intended shape of the pad and to maintain and apply constant moist heat/cooling of all its surface areas. Suitable fill-material includes, but is not limited to, dried rice, buckwheat hulls, flaxseed, cracked corn, beans, peas or sand. An aromatic may be added to the organic fill-material to eliminate any odors that may be present during continued use of the pad such as, but not limited to, spices such as allspice, cinnamon, cloves, nutmeg, and the like or wood chips such as cedar, oak, and the like.

The filled-chambered bag is to be used in any and all places where one's pet either sleeps, rests, or stays for any length of time. Examples of this may be, but are not limited to, the pets' bed, sleeping quarters, or favorite resting place. Because of its pliability, it may also be applied directly to any area of the pet's body which may suffer from discomfort or soreness. The filled chambered bag is uniquely designed to maintain its shape and to fit snugly under the pets' mainframe to either raise or lower its body temperature after the bag is heated or cooled as the case may be. The inner fill pads/bags are covered with a design cover which serves to protect the inner bag from excessive pet dander, soil, and pet hair. Various sizes, various design covers, and various shapes may be used for the inner bag/pad and for the outer design cover. All of the outside protective design covers are crafted of a durable material with a soft, pliable, and washable fabric. Such materials include, but are not limited to, muslin, flannel, cotton, canvas, denim, and blends thereof.

Accordingly, several objects and advantages of my invention are to:

(a) provide for a bag or pad which houses granular material, which has heat-retaining and cold-retaining properties, to maintain its shape when filled;

(b) construct a bag or pad which, with its internal structure of cells and diverters, facilitates its filling process; and (c) permit a pet owner to provide for greater comfort for the owner's pet.

The foregoing has outlined some of the more pertinent objects of the present invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF SUMMARY OF THE INVENTION

The above-noted problems, among others, are overcome by the present invention. Briefly stated, the present invention contemplates a shape-retaining fill container having a front member and a back member connected to each other defining a chamber therebetween for housing and retaining a fill material within a plurality of cells comprised of a plurality of walls connected to the front member and to the back member, and one or more flow diverters adjacent to the cells and on the ends of the walls. A passageway is on a fill-side with a second passageway on an opposing side, each passageway extending approximately from one end side to another end side of the container. Fill material, with heat-retaining and cold-retaining qualities passes through the cells and the passageways in a fashion dictated by the flow diverters until the bag is filled. The configuration of the various cells and flow diverters cause the fill material within to maintain the shape of the bag. Approximately 80% of the bag comprises fill material.

The foregoing has outlined the more pertinent and important features of the present invention in order that the detailed description of the invention that follows may be better understood so the present contributions to the art may be more fully appreciated. Additional features of the present invention will be described hereinafter which form the subject of the claims. It should be appreciated by those skilled in the art that the conception and the disclosed specific embodiment may be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

For a fuller understanding of the nature and objects of the invention, reference should be made to the following detailed description taken in conjunction with the accompanying drawings in which:

FIG. 1 is perspective view of one embodiment of the invention.

FIGS. 2A and 2B, taken on line 2A-B—2A-B of FIG. 1, illustrate the invention without fill material and with fill material respectively.

FIGS. 3A and 3B, taken on line 3A-B—3A-B of FIG. 1, illustrate the invention without fill material and with fill material respectively.

FIGS. 4A and 4B, taken on line 4A-B—4A-B of FIG. 1, illustrate the invention without fill material and with fill material respectively.

DETAILED DESCRIPTION OF THE INVENTION

Figure 8:
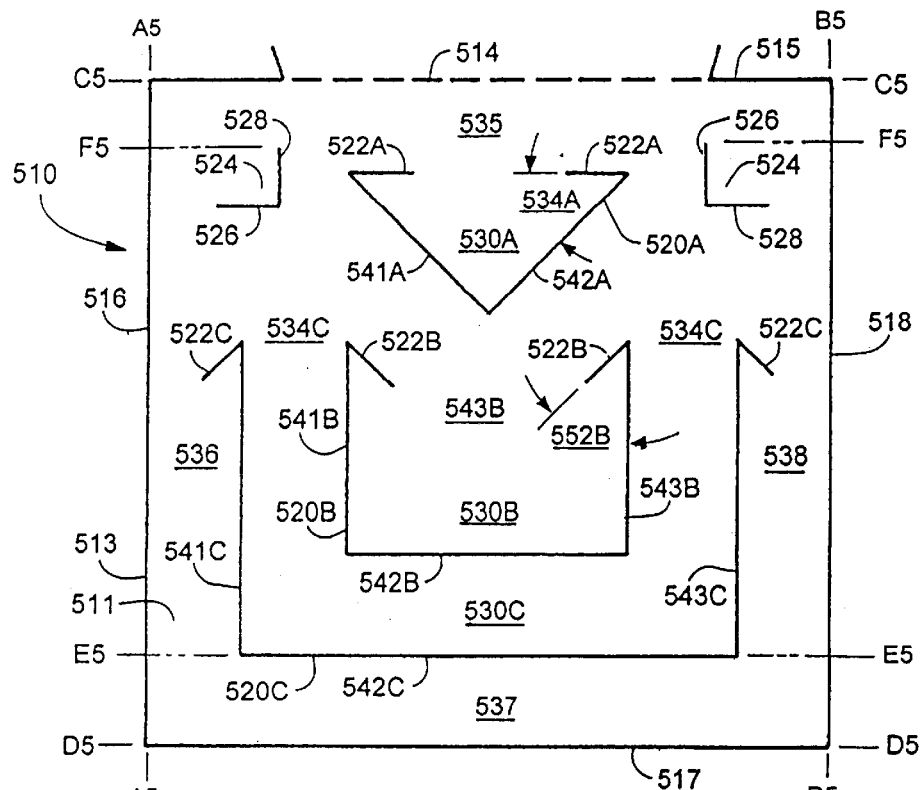
FIG. 8 is a front elevation view, in schematic form, of a fifth embodiment of the present invention.

Referring now to the drawings in detail and in particular to FIG. 1, reference character 10 generally designates a pad-like or bag-like container constructed in accordance with a preferred embodiment of the present invention. It is comprised of a resilient material such as, but not limited to muslin, flannel, cotton, canvas, denim, and blends thereof. The container 10 has a front side 11 and a back side 13 joined together generally around the edges to define an inner chamber therein 12. The Joining the front side 11 and the back side 13 may be by any conventional means, such as, but not limited to, stitching, gluing, stapling, or any suitable joining method or device suited for the intended purpose. Stitching 19 is illustrated and is the preferred means. The stitching 19 is shown to be inward from the outer edges for ease of illustration only and not by way of limitation. The shape of the container 10 as illustrated here, as well as in the following figures, is square-like; but it must be understood that the shape may be circular, oval, triangular, rectangular, design-shaped [forming a heart, an animal, a toy, and the like], or any other multi-sided shape. All such shapes have a top side, a bottom side, and a left and right side [or quadrant] at a minimum.

A square-shape is illustrated for administrative clarity. In this regard, the container 10 has two end sides 16, 18 [or left and right, respectively], a top side 15 which has a sealable opening 14 disclosing the inner chamber 12, and a bottom side 17 on an opposing side to the top side 15. As shown in this illustration, with the opening 14 at the top 15, the top is also referred to herein as the fill-side 15 through which a suitable fill material passes into the inner chamber 12. The sealing mechanism illustrated in this example is a cooperating hook 54 and loop 56 type fastener [commonly referred to Velcro®]. The opening 14 is also, but need not be, sealed by stitching 19. The purpose of the fill material is to retain heat [when the bag 10 with fill material within is heated] or to retain cold or cooling properties [when the bag 10 is chilled] as the case may be. Heating may be by microwaving the bag 10; chilling may be by placing the bag 10 in the freezer. Any fill material, such as, but not limited to, dried rice, buckwheat hulls, cracked corn, beans, peas, sand, flaxseed, or any other similar material suited for the intended purpose will suffice.

Within the inner chamber 12 are a plurality of cells 30A, B defined therein by a plurality of walls 20. The walls 20 in this illustration are formed by stitching 19, for example, the front side 11 to the back side 13, leaving an opening for each cell 30A, B to accept fill material. It should be understood that all the cell walls and appurtenances thereto in the other embodiments [i.e., FIGS. 5–8] may be created by stitching. In this example, the walls 20 are approximately perpendicular to the opening 14 such that, as fill material enters the container 10, the direction of flow of the fill material is approximately parallel to the plane of the walls 20. Fill material flows directly downward from the fill side 15 straight through each cell 30A, B as dictated by the structure of each wall 20 defining each cell 30A, B and the respective flow diverters 22.

Each wall 20 ends short of the bottom 17 and short of the top 15 defining a passageway 35 at the fill side 15 which extends approximately from one end side 16 to the other end side 18, and defining a second passageway 37 at the opposing side 17 of the fill side 15 which also extends approximately from one end side 16 to the other end side 18. A flow diverter 22, one or more, is disposed at or adjacent to the end of each wall 20. The flow diverter 22, in combination with the walls 20, facilitate the flow of fill material thereby hastening the fill process and facilitates shape-retention of the container 10 after it has been filled with fill material 58. FIGS. 2A through 4B illustrate the internal structure of the container 10 with and without fill material 58. In FIGS. 2A, 3A, and 4A, the cells are without fill material 58. In FIGS. 2B, 3B, and 4B, the cells are with fill material 58 and, therefore, are expanded. A bag, container, or pad 10 filled with fill material 58, in the absence of suitable cells 30A, B or chambers within, will retain its shape generally only when either front side or back side is placed down on a flat surface. Should such a bag be picked up at by either end side or by the top or bottom, generally all the fill material will remain at the relative bottom as the bag is being lifted. The bag, thereby will lose its shape and require only minor fluffing or reshaping.

The walls 20 and flow diverters 22, as structured by the several embodiments of the present invention, form the cells to maintain the shape of the container 10 regardless from which end or side or how the container is lifted. As illustrated, the flow diverters 22 on the ends of each wall 20 face either inward or outward forming an angle relative to the wall 20. For good results on quicker filling and for shape-retaining, the angle so formed should be between about 60°–120°; an angle of about 90° provides even better results. The walls 20 are spaced approximately evenly apart from one another and from each end side 16, 18; that is, the distance from A–B is approximately the same as from B–C, as from C–D, as from D–E, and as from E–F. The width for the fill-side passageway 35 [lines G–H], and the width of the second passageway 37 [lines I–J], are also approximately equal to the width of the cells 20. Reference characters 1X–1Y represent an approximate vertical center-line of the container 10. This vertical phantom line 1X–1Y is for illustration purpose only and is provided for administrative clarity to assist in describing the structural features of this embodiment. For best filling capabilities and shape-retaining features, this centerline 1X–1Y generally should cut through or approximately bisect a cell 30A [lines C–D]. The walls 20 of the bisected cell 30A are about equally spaced from the center-line 1X–1Y. The flow diverters 22 proximal to the fill side 15 face toward each other and toward the center-line 1X–1Y. The length of these flow diverters 22 is approximately 20%–30% of the width of the cell 30A [line C–D]. The flow diverters 22 distal from the fill side 15 face outward toward their respective end sides 16, 18. The length of these, and all the other, flow diverters 22 in this embodiment 10 also is approximately 20%–30% of the width of the cell 30A [line C–D]. Each additional wall 20, flow diverter 22, cell 30B combination outward of the middle cell [line C–D] is similarly configured. Outward of the last cell on each side [cell 30B on line B–C and cell on line D–E] is another passageway 36, 38 or cell-like structure. These passageways 36, 38 are approximately of the same width as the passageways at the fill side 35 and the opposing side 37 [i.e., G–H approximately equal to I–J, A–B, and E–F).

Figure 6:
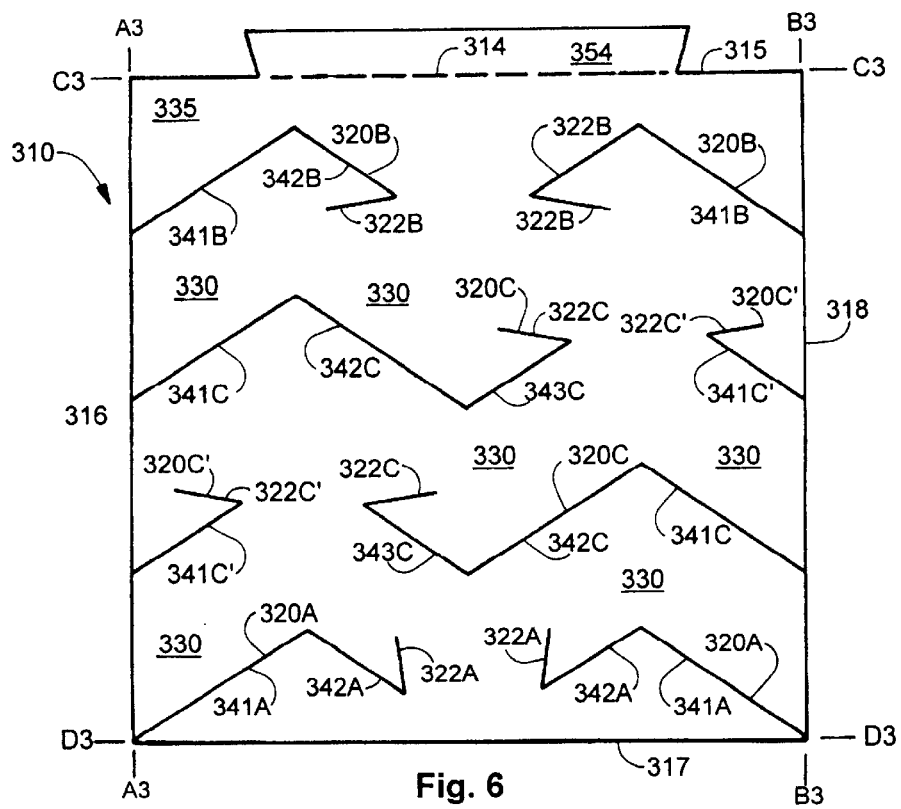
FIG. 6 is a front elevation view, in schematic form, of a third embodiment of the present invention.

The opening 14 of this container 10 may be a slit-like opening as illustrated in FIG. 1 or may be spout-like or funnel-like opening 354 as illustrated in FIG. 6. In any event, the funnel-like opening 354 is sealable by stitching 19, by tying [not shown], by cooperating hook-and-loop fastening components 54, 56 [as illustrated in FIG. 1].

Figure 5:
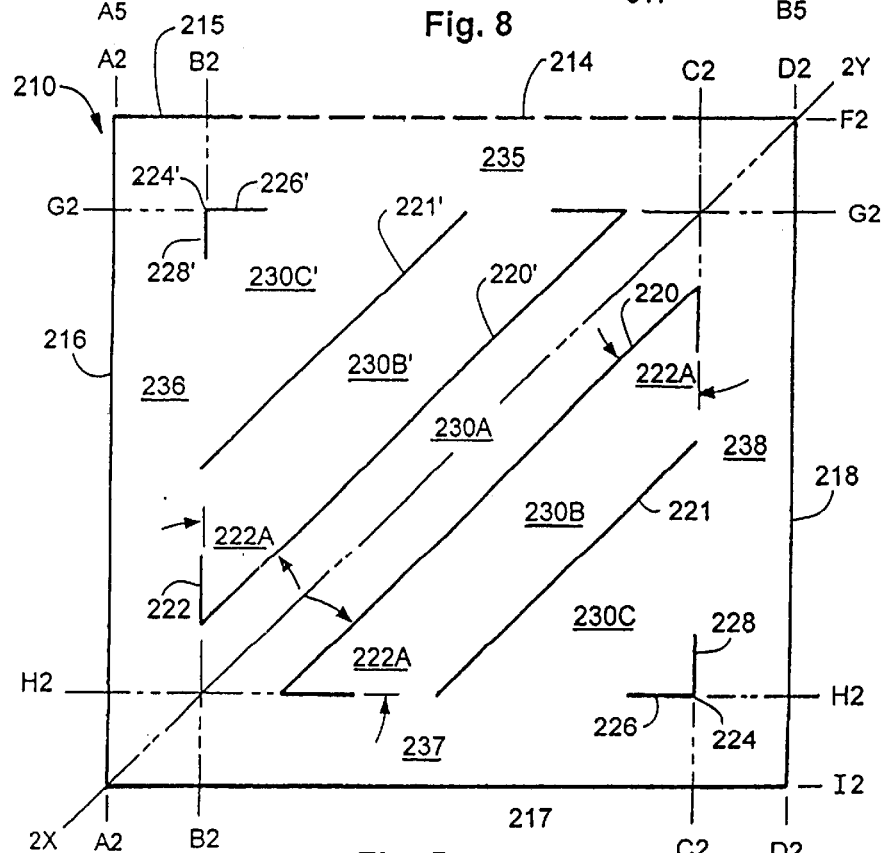
FIG. 5 is a front elevation view, in schematic form, of a second embodiment of the present invention.

FIG. 5 illustrates another embodiment of the present invention. This container 210 has walls in pair-sets 220, 221 which are diagonally disposed in relation to the fill side 215 and its opening 214. The angle of disposition is approximately 30°–60° relative to a horizontal plane [line F2]. An angle of approximately 45° provides for better fill results and shape-retaining capabilities. The first pair-set 220 has an elongated wall 220 with at least one flow diverter 222 at each end. Each flow diverter 222 thereat is angled 222A, relative to the elongated wall 220, approximately between 30°–60°. An angle of approximately 45° provides for better filling results and shape-retaining capabilities. The respective flow diverters 222 may, but need not be, angled such that they face toward each other as illustrated in the figure.

Depending of the desired size of the container 210, any number of such pair-sets 220 may be used. The first such pair-set 220 has each single wall on opposite sides of a phantom diagonal center-line represented by line 2X–2Y. This diagonal line 2X–2Y is for illustration purpose only and is provided for administrative clarity to assist in describing the structural features of this embodiment. The cell 230A formed over this center-line 2X–2Y has each wall 220 of the cell 230A approximately equally spaced apart of the center-line 2X–2Y. The distance from the flow diverter 222 [on approximately line G2], adjacent to the fill side 215 [line F2], to the fill side 215 is approximately the same as is the distance of the flow diverter 222 [on approximately line B2] to the left end side 216 [line A2]. The distance from the flow diverter 222 [on approximately line H2], adjacent to the bottom side 217 [line I2], to the bottom side 217 is approximately the same as is the distance of the flow diverter 222 [on approximately line C2], to the right end side 218 [line D2]. Depending on the desired size of this container 220, more than one such pair-set 220 may be used.

One or more second pair-sets 221, 221' follow the last wall [as measured outward of or away from the diagonal centerline 2X–2Y] of the first pair-set 220. The walls 221, 221' of these following pair-sets are approximately parallel and adjacent to each last outward wall of the last elongated wall pair-set. These adjacent walls 221, 221' are generally shorter than the walls of any of the elongated wall pair-sets 220 and, generally, are without flow diverters at their respective ends which terminate at approximately lines G2 and B2 for adjacent wall 221' and at lines H2 and C2 for adjacent wall 221. Outward of the last wall of the adjacent wall 221' [toward quadrant A2–F2] is another flow diverter 224' formed by two adjacent extensions 226', 228' having an angle of approximately 60°–120° at their area of adjacency with the angle so formed facing outward from the diagonal centerline 2X–2Y. An angle of approximately 90°, however, provides for better fill results and shape-retaining capabilities. One or more such flow diverter 224' combinations may be used. At the opposing quadrant D2–I2 is another similarly disposed flow diverter 224 having at least two extensions 226, 228 forming an angle of approximately 60°–120° at their area of adjacency. An angle of approximately 90°, however, provides for better fill results and shape-retaining capabilities.

More than one pair-set of the elongated wall combinations 220 may be used as well as more than one pair-set of the adjacent wall combinations 221, 221'. In the illustration only one pair-set of each is shown forming cells 230A, 230B, 230B', 230C, and 230C'. A passageway 235 at the fill side 215 is defined by flow diverter extension 226' and flow diverter 222 at approximately line G2. Similarly, a second passageway 237 is defined by flow diverter extension 226 and flow diverter 222 at approximately line H2; and two other passageways 236, 238 [left side 216 and right side 218, respectively] are defined by flow diverter extension 228' and flow diverter 222 from approximately line B2 to end side 216 and by flow diverter extension 228 and flow diverter 222 from approximately line C2 to end side 218.

A third embodiment is illustrated in FIG. 6. The container 310 has a plurality of wall pair-sets 320A, 320B, 320C, and 320C' within which define a plurality of cells 330. As disclosed above, more than one pair of each pair-set may be used in the container 310 of this embodiment. A first pair-set 320A is adjacent to the bottom side 317 and forms a passageway 337 thereat which runs approximately from one end side 316 to the other end side 318. Each first pair-set 320A has a wall having a first leg wall 341A which extends inward and upward from the bottom 317 left and right side 316, 318 at approximately between 30°–60° relative to a horizontal plane [line D3]. An angle of approximately 45° provides for better fill results and shape-retaining capabilities. This is followed by a second leg wall 342A extending downward from the first leg wall 341A at approximately between 70°–140° relative to the first leg wall 341A. An angle of approximately 105° provides for better fill results and shape-retaining capabilities. A flow diverter 322A, adjacent to the second leg wall 342A, completes the first pair-set 320A. The flow diverter 322A extends upward from the second leg wall 342A at approximately between 30°–60° relative to the second leg wall 342A. An angle of approximately 45° provides for better fill results and shape-retaining capabilities.

A second pair-set 320B is above the first pair-set 320A, preferably at or near to the fill side 315. Like the first pair-set 320A, this pair-set 320B defines a passageway 335 adjacent to the fill side 315 running approximately from one end side 316 to the other end side 318. Each second pair-set 320B has a wall having a first leg wall 341B which extends inward and upward from the fill side 315 left and right side 316, 318 at approximately between 10°–60° relative to a horizontal plane [line D3]. An angle of approximately 30° provides for better fill results and shape-retaining capabilities. This is followed by a second leg wall 342B extending downward from the first leg wall 341B at approximately between 75°–145° relative to the first leg wall 341B. An angle of approximately 110° provides for better fill results and shape-retaining capabilities. A flow diverter 322B, adjacent to the second leg wall 342B, completes the second pair-set 320B. The flow diverter 322B extends outward [toward each respective end side 316, 318] from the second leg wall 342B at approximately between 35°–90° relative to the second leg wall 342B. An angle of approximately 60° provides for better fill results and shape-retaining capabilities.

One or more different pair-sets 320C, 320C' may be added in between the first and second pair-sets 320A, 320B. This different pair-set 320C, 320C' has on one end side [either 316 or 318] a wall having a first leg wall 341C which extends inward and upward from the either end side 316, 318 at approximately between 10°–60° relative to a horizontal plane [line D3]. An angle of approximately 30° provides for better fill results and shape-retaining capabilities. This is followed by a second leg wall 342C extending downward from the first leg wall 341C at approximately between 75°–145° relative to the first leg wall 341C. An angle of approximately 110° provides for better fill results and shape-retaining capabilities. This is followed by a third leg wall 343C extending upward from the second leg wall 342C at approximately between 75°–145° relative to the second leg wall 342C. An angle of approximately 110° provides for better fill results and shape-retaining capabilities. A flow diverter 322C, adjacent to the end of the third leg wall 343C, completes the third pair-set 320C. The flow diverter 322C extends toward the respective end side 316, 318 from which that part of the pair-set originated at an angle of approximately between 35°–90° relative to the third leg wall 343C. An angle of approximately 60° provides for better fill results and shape-retaining capabilities.

On an end side opposite the end side of the first part 320C, the second part 320C' of this pair-set 320C, 320C' has a first leg 341C' extending inward and upward at approximately between 10°–60° from a horizontal plane D3. An angle of approximately 30° provides for better fill results and shape-retaining capabilities. A flow diverter 322C', adjacent to the end of the first leg wall 341C', completes the second part of this pair-set 320C, 320C'. The flow diverter 322C' extends toward each respective end side 316, 318 from which that part of the pair-set originated at an angle of approximately between 30°–70° relative to the first leg wall 341C'. An angle of approximately 50° provides for better fill results and shape-retaining capabilities. If more than one pair of this different pair-set 320C, 320C' is desired, the first part 320C should be on alternating end sides from the previous first part 320C as is illustrated in the figure. For example, if three such pair-sets were desired, on end side 318 the first part 320C may be above the first pair-set 320A, and above the first part 320C would be the second part 320C'. On the opposite end side 316 would be the second part 320C' above the first pair-set 320A, and above the second part 320C' would be the first part 320C.

Figure 7:
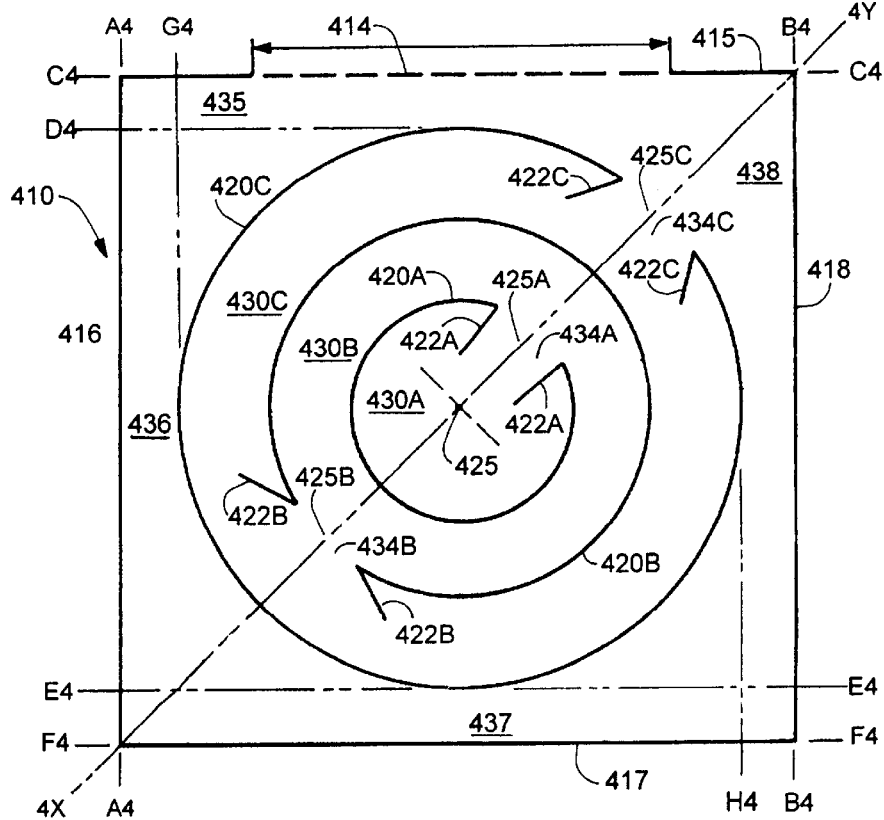
FIG. 7 is a front elevation view, in schematic form, of a fourth embodiment of the present invention.

A fourth embodiment is illustrated in FIG. 7 wherein the container 410, like its counterparts, has a top or fill side 415, a bottom side 417 opposing the fill side 415, and two end sides 416, 418. The walls 420A, 420B, 420C therein defining the cells 430A, B, C are concentric circle-shaped. As before, and for the sake of clarity in description only, a diagonal line 4X–4Y is shown to run through the center 425 of the container 410. The first concentric wall 420A surrounds the center 425 and has an opening 434A with one or more flow diverters 422A at the ends of the opening 434A. The flow diverters 422A project into the cell 430 defined by the wall 420A. The angle of the flow diverters 422A, relative to a horizontal plane defined by line F4 is approximately between 20°–70°. An angle of approximately 45° [approximately parallel to line 4X–4Y] provides for better fill results and better shape-retaining capabilities. The approximate center 425A of the opening 434A is at or near the diagonal line 4X–4Y and facing the quadrant defined by line B4–C4.

The second concentric wall 420B encircles the first concentric wall 420A. The second concentric wall 420B also has an opening 434B with an approximate center 425B lying on the diagonal 4X–4Y and facing the quadrant defined by line A4–F4. One or more flow diverters 422B project outward of the cell 430B defined by its wall 420B and into cell 430C. The angles of these flow diverters 422B are approximately 90°–180° relative to line 4X–4Y. The third concentric wall 420C encircles the second concentric wall 420B. It also has an opening 434C with an approximate center 425C lying on the diagonal 4X–4Y and facing the quadrant defined by line B4–C4. One or more flow diverters 422C project into the cell 430C defined by the third concentric wall 420C. The angles of these flow diverters 422C are approximately 90°–180° relative to line 4X–4Y. It must be understood that more than the three concentric walls illustrated in this figure may be used depending on the size and desire of the user/manufacturer. Regardless of the quantity, following this scheme of alternating the openings to be generally on opposing sides provides for better fill results and better shape-retaining capabilities.

The last concentric wall [in this illustration 420C] generally lies on or within lines D4, H4, E4, and G4 thereby defining a passageway 435 adjacent to the fill side 415 [C4–D4], a second passageway 437 adjacent to the bottom 417 [E4–F4], and another passageway 436 [A4–G4], 438 [B4–H4] adjacent to each respective end side 416, 418.

Another embodiment of the fill container 510 is illustrated in FIG. 8. It has a top or fill side 515, a bottom 517, and two opposing end sides 516, 518. The opening 514 is on the fill side 515. The walls defining the cells 530A, B, C within are a plurality of wall-sets 520A, 520B, 520C. It must be understood, as aforementioned, that although only three such wall-set are illustrated, more may be used without departing from the scope and spirit of the present invention and all its embodiments. The first wall-set 520A has a first leg 541A and a second leg 542A adjacent to the first let 541A. At their area of adjacency, they form an angle of approximately between 60°–120°. An angle of approximately 90° provides for better fill results and better shape-retaining capabilities. Adjacent to the ends of each leg 541A, 542A is at least one flow diverter 522A, generally facing one another leaving an opening 434A through which fill material 58 may pass into the cell 530A. The flow diverters 522A are angled at approximately between 20°–70° relative to the legs to which adjacent. An angle of approximately 45° provides for better fill results and better shape-retaining capabilities. The opening 434A faces the fill side 415 and the angle 551A at the area of adjacency of the two legs 541A, 542A of the first wall-set 520A faces the second wall-set 520B.

This second wall-set 520B has three legs 541B, 542B, 543B defining the cell 530B. The area of adjacency of each leg 541B, 542B, 543B of this wall-set 520B creates an angle of approximately between 60°–120°. An angle of approximately 90° provides for better fill results and better shape-retaining capabilities. Adjacent to the ends of each last leg 541B, 543B is at least one flow diverter 522B, generally facing one another, and projecting into the cell 530B. The flow diverter 522B leaves an opening 534B through which fill material 58 may pass into, and be retained by, the cell 530B. The flow diverters 522B are angled at approximately between 20°–70° relative to the legs to which adjacent. An angle of approximately 45° provides for better fill results and better shape-retaining capabilities. The opening 534B faces the area of angle 551A of the first cell 530A.

A third wall-set 520C outlines the second wall-set 520B. It is structured much like the first wall-set 520B in that it has three legs 541C, 542C, 543C defining the cell 530C. The area of adjacency of each leg 541C, 542C, 543C of this wall-set 520C creates an angle of approximately between 60°–120°. An angle of approximately 80°–90° provides for better fill results and better shape-retaining capabilities. Adjacent to the ends of each last leg 541C, 543C is at least one flow diverter 522C, generally facing away from one another and toward the respective end sides 516, 518, and projecting into the passageways 536, 538 defined by legs 541C and 543C. The flow diverter 522C leaves an opening 534C between it and the flow diverter 522B through which fill material 58 may pass into, and be retained by, the cell 530C. The flow diverters 522C are angled at approximately between 20°–70° relative to the legs to which adjacent. An angle of approximately 45° provides for better fill results and better shape-retaining capabilities. The openings 534C face the area of angle 551A of the first cell 530A. The flow diverters 522C also function to retain fill material 58 within the respective end side passageways 536, 538.

Adjacent to each side of cell 530A is one or more additional flow diverters 524; each of which are in this illustration in quadrant A5–C5 and quadrant B5–C5, respectively. Each such flow diverter 524 is formed of two adjacent extensions 526, 528 which form an angle at their area of adjacency of approximately between 60°–120°. An angle of approximately 90°, however, provides for better fill results and shape-retaining capabilities. Neither extension 526, 528 extends into either end side 516, 518 or up to the fill side 515; nor does the bottom-most cell wall 542C of cell 530C extend to the bottom 517. By such configuration, a fill-side passageway 535, a second passageway 537, and end-side passageways 536, 538 are formed.

As for all embodiments, the respective openings 14, 214, 314, 414, 514 may transverse the full length of their respective fill sides 15, 215, 315, 415, 515; may be off-center and more toward one or the other end side; or may be centered and extend outward toward each respective end side approximately up to or over the vertical plane defined by any one or more flow diverters within the chamber. Further defining the fill bag, is a protective cover, bearing any design, to provide for greater durability of wear to the fill bag within.

It must be understood that the opening for the fill bag may, but need not be, on the top 14 and in the manners and dimensions as illustrated in FIGS. 1, 2A, 6, and 7; but may also encompass the full length or portion thereof of any side; i.e., top, bottom, or either side, or any combination thereof utilizing either hook-and-loop type closing mechanisms, tie-type mechanisms, or stitching, or any combination thereof and any other conventional means suited for the intended purpose.

The present disclosure includes that contained in the present claims as well as that of the foregoing description. Although this invention has been described in its preferred forms with a certain degree of particularity, it is understood that the present disclosure of the preferred forms has been made only by way of example and numerous changes in the details of construction and combination and arrangement of parts may be resorted to without departing from the spirit and scope of the invention. Accordingly, the scope of the invention should be determined not by the embodiments illustrated, but by the appended claims and their legal equivalents.

The invention claimed is:

1. A shape-retaining fill container comprising:
   (a) a front member and a back member connected to each other defining a chamber therebetween for housing a fill material, said front member and said back member each comprised of a resilient material;
   (b) a first passageway in said chamber on a fill-side of said container and a second passageway on an opposing side to said fill-side, said first passageway and said second passageway extending approximately from a first end side of said container to a second end side of said container;
   (c) a plurality of walls, connected to said front member and to said back member, defining a plurality of cells in said chamber adapted to hold a fill material wherein said plurality of walls is vertically disposed and are approximately parallel to one another and approximately equally spaced from one another and from said first and second end sides of said container and wherein each one of said plurality of walls has a first end which extends to said first passageway and a second end which extends to said second passageway;
   (d) one or more flow diverters adjacent to one or more of said plurality of cells wherein at least one of said one or more flow diverters is disposed on each said end of each one of said plurality of walls and wherein each one of said one or more flow diverters on each said end of each one wall of said plurality of walls are angled between approximately 60°–120° relative to said each one wall of said plurality of walls and on said first end extends toward said first end side and on said second end extends toward said second end side; and
   (e) a third passageway on each said end side, said third passageway in communication with said first passageway and in communication with said second passageway.

2. The container according to claim 1 further comprising a sealable opening on said fill-side of said container, said sealable opening in communication with said first passageway.

3. A shape-retaining fill container comprising:
   (a) a front member and a back member connected to each other defining a chamber therebetween for housing a fill material, said front member and said back member each comprised of a resilient material;
   (b) a plurality of walls, connected to said front member and to said back member, defining a plurality of cells in said chamber adapted to hold a fill material wherein said plurality of walls comprises one or more pairs of elongated walls approximately parallel to one another, each said one or more pairs of elongated walls having at least one of one or more flow diverters thereon, said one or more flow diverters adjacent to one or more of said plurality of cells, with ends of said at least one of said one or more flow diverters angled toward one another and wherein said plurality of walls further comprises one or more walls adjacent, and approximately parallel, to each one of an outward last wall of said one or more pairs of elongated walls; and (c) a first passageway in said chamber on a fill-side of said container and a second passageway on an opposing side to said fill-side, said first passageway and said second passageway extending approximately from one end side of said container to another end side of said container.

4. The container according to claim 3 further comprising a third passageway on each said end side, said third passageway in communication with said first passageway and in communication with said second passageway.

5. The container according to claim 4 further comprising at least one of another of said at least one flow diverter outward of each of a last one of said one or more walls adjacent to each one of said outward last walls of said one or more pairs of elongated walls; said at least one of another of said at least one flow diverter having two extensions angled between approximately 60°–120° relative to each other with each one of said two extensions being on approximately the same plane as at least one of said one or more flow diverters.

6. A shape-retaining fill container comprising:

(a) a front member and a back member connected to each other defining a chamber therebetween for housing a fill material, said front member and said back member each comprised of a resilient material;

(b) a plurality of walls, connected to said front member and to said back member, defining a plurality of cells in said chamber adapted to hold a fill material wherein said plurality of walls further comprise a plurality of pair-sets on opposite end sides from one another with a first pair-set comprising a first leg wall extending inward and upward at approximately between 20°–70° from a horizontal plane, a second leg extending downward from said first leg at approximately between 70°–140° relative to said first leg, and one of one or more flow diverters extending upward from said second leg at approximately between 20°–70° relative to said second leg, said one or more flow diverters adjacent to one or more of said plurality of cells; and (c) a first passageway in said chamber on a fill-side of said container and a second passageway on an opposing side to said fill-side, said first passageway and said second passageway extending approximately from one end side of said container to another end side of said container.

7. The container according to claim 6 wherein said plurality of walls further comprise a second pair-set on opposite end sides from one another comprising a first leg extending inward and upward at approximately between 10°–60° from a horizontal plane, a second leg extending downward from said first leg at approximately between 75°–145° relative to said first leg, and another one of said one or more flow diverters extending outward from said second leg at approximately between 35°–95° relative to said second leg.

8. The container according to claim 7 wherein said plurality of walls further comprise at least one different pair-set having as a first part of said different pair-set a first leg extending inward and upward at approximately between 10°–60° from a horizontal plane, a second leg extending downward from said first leg at approximately between 75°–145° relative to said first leg, a third leg extending upward from said second leg at approximately between 75°–145° relative to said second leg, and a different one of said one or more flow diverters extending inward of said third leg at approximately between 35°–90° relative to said third leg, and having as a second part of said different pair-set on the opposite side of said first part, a first leg extend inward and upward at approximately between 10°–60° from a horizontal plane and another different one of said one or more flow diverters extending outward from said first leg at approximately between 30°–70° relative to said first leg.

9. A shape-retaining fill container comprising:

(a) a front member and a back member connected to each other defining a chamber therebetween for housing a fill material, said front member and said back member each comprised of a resilient material;

(b) a plurality of walls, connected to said front member and to said back member, defining a plurality of cells in said chamber adapted to hold a fill material wherein said plurality of walls comprise two or more concentric circular-shaped walls each of which have at least one opening thereon and at least one of one or more flow diverters adjacent to said at least one opening, wherein said one or more flow diverters is adjacent to one or more of said plurality of cells; and (c) a first passageway in said chamber on a fill-side of said container and a second passageway on an opposing side to said fill-side, said first passageway and said second passageway extending approximately from one end side of said container to another end side of said container.

10. The container according to claim 9 wherein each one of said at least one or more flow diverters is angled away from said opening.

11. The container according to claim 9 further comprising a third passageway on each said end side, said third passageway in communication with said first passageway and in communication with said second passageway.

12. The container according to claim 9 wherein said at least one opening for each of said two or more concentric circular-shaped walls has a center wherein each said center is aligned, with at least one of another said center, on approximately a 180° plane relative to one another.

13. A shape-retaining fill container comprising:

(a) a front member and a back member connected to each other defining a chamber therebetween for housing a fill material, said front member and said back member each comprised of a resilient material;

(b) a first passageway in said chamber on a fill-side of said container and a second passageway on an opposing side to said fill-side, said first passageway and said second passageway extending approximately from one end side of said container to another end side of said container; and (c) a plurality of walls, connected to said front member and to said back member, defining a plurality of cells in said chamber adapted to hold a fill material wherein said plurality of walls further comprise a plurality of wall-sets each having:

(1) at least two legs adjacent to one another wherein one of said plurality of cells lies at said adjacencies;

(2) an opening into said one of said plurality of cells, said opening facing said fill-side;

(3) at least one of one or more flow diverters adjacent to each said opening into said one or more said plurality of cells; and (4) at least one of said one or more flow diverters at each end side of said first passageway, wherein said one or more flow diverters are adjacent to one or more of said plurality of cells and wherein at least one of said one or more flow diverters comprise at least two extensions adjacent to one another and defining a flow-diverter angle of approximately between 60° to 120° at a point of adjacency wherein said flow-diverter angle faces inward and downward in said container.

14. The container according to claim 13 further comprising a third passageway on each said end side, said third passageway in communication with said first passageway and in communication with said second passageway.

15. The container according to claim 14 wherein at least one of said plurality of wall sets comprises two legs whose said adjacency forms an angle of between approximately 60° to 120° wherein said angle faces said third passageway.

16. The container according to claim 13 wherein at least one of said plurality of wall sets comprises at least three legs adjacent to one another wherein each of said at least three legs forms another angle between a first leg and a second leg and between said second leg and a third leg respectively of between approximately 60° to 120°.

* * * * *